US012204949B2

(12) United States Patent
Lincourt, Jr. et al.

(10) Patent No.: US 12,204,949 B2
(45) Date of Patent: Jan. 21, 2025

(54) METHOD AND SYSTEM FOR MANAGING ACCELERATOR POOLS TO PERFORM SUBPORTIONS OF PORTIONS OF WORKFLOWS

(71) Applicant: EMC IP Holding Company LLC, Hopkinton, MA (US)

(72) Inventors: Robert Anthony Lincourt, Jr., Franklin, MA (US); John S. Harwood, Boston, MA (US); William Jeffery White, Plano, TX (US); Douglas L. Farley, Round Rock, TX (US); Victor Fong, Medford, MA (US); Christopher S. MacLellan, Uxbridge, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 663 days.

(21) Appl. No.: 17/236,708

(22) Filed: Apr. 21, 2021

(65) Prior Publication Data

US 2022/0342720 A1 Oct. 27, 2022

(51) Int. Cl.
*G06F 9/50* (2006.01)
*H04L 67/01* (2022.01)
*H04L 67/1097* (2022.01)

(52) U.S. Cl.
CPC .......... *G06F 9/5083* (2013.01); *G06F 9/5016* (2013.01); *G06F 9/5077* (2013.01);
(Continued)

(58) Field of Classification Search
CPC .... G06F 9/5083; G06F 9/5016; G06F 9/5077; G06F 2209/5011; G06F 9/5061;
(Continued)

(56) References Cited

U.S. PATENT DOCUMENTS 7,720,864 B1 * 5/2010 Muth .................... G06F 16/128
709/228
9,356,883 B1 5/2016 Borthakur
(Continued)

OTHER PUBLICATIONS

Nora Jones et al., "Chaos Engineering", O'Reilly Media, Inc, 2020. Print. (Year: 2020).

*Primary Examiner* — Meng Ai T An
*Assistant Examiner* — Willy W Huaracha
(74) *Attorney, Agent, or Firm* — Chamberlain, Hrdlicka, White, Williams & Aughtry; Aly Dossa

(57) ABSTRACT

Techniques described herein relate to a method for managing workflows. The method may include obtaining, from a client, by a registration manager associated with accelerator pools, a request to perform a portion of a workflow using accelerators; identifying a minimum quantity and a maximum quantity of accelerators associated with the request; identifying a storage to store data associated with the portion of the workflow; identifying an accelerator pool of the accelerator pools that includes at least the maximum quantity of accelerators; establishing a connection between the client, the storage, and accelerators of the accelerator pool to perform the portion of the workflow; and initiating the performance of the portion of the workflow using the storage, the client, and the accelerators of the accelerator pool.

11 Claims, 8 Drawing Sheets

(52) U.S. Cl.
CPC .......... *H04L 67/01* (2022.05); *H04L 67/1097* (2013.01); *G06F 2209/5011* (2013.01)

(58) Field of Classification Search
CPC ... H04L 67/01; H04L 67/1097; H04L 67/025; H04L 67/10015
See application file for complete search history.

(56) References Cited

U.S. PATENT DOCUMENTS

| | | |
|---|---|---|
| 10,996,658 B1 | 5/2021 | Potts et al. |
| 11,055,135 B2 | 7/2021 | Popovic et al. |
| 11,176,534 B1 | 11/2021 | Pandey et al. |
| 2003/0149685 A1 | 8/2003 | Trossman et al. |
| 2005/0256818 A1 | 11/2005 | Sun et al. |
| 2008/0072303 A1 | 3/2008 | Syed |
| 2011/0138147 A1 | 6/2011 | Knowles et al. |
| 2011/0145318 A1* | 6/2011 | Krishnamurthy ..... G06F 9/5027 709/203 |
| 2014/0075004 A1 | 3/2014 | Van Dusen et al. |
| 2014/0223427 A1 | 8/2014 | Bootland et al. |
| 2016/0075436 A1 | 3/2016 | Rossano et al. |
| 2016/0119289 A1 | 4/2016 | Jain et al. |
| 2016/0162478 A1 | 6/2016 | Blassin et al. |
| 2016/0300178 A1 | 10/2016 | Perry et al. |
| 2016/0357241 A1 | 12/2016 | Ramadoss et al. |
| 2016/0364271 A1* | 12/2016 | Burger ................. G06F 9/5044 |
| 2017/0032048 A1* | 2/2017 | Qu ..................... G06F 16/9554 |
| 2017/0048318 A1 | 2/2017 | Hebert et al. |
| 2017/0078392 A1 | 3/2017 | Gray et al. |
| 2017/0346683 A1 | 11/2017 | Li |
| 2018/0157651 A1 | 6/2018 | Smith et al. |
| 2018/0255329 A1 | 9/2018 | Gonzalez-banos et al. |
| 2018/0276044 A1 | 9/2018 | Fong et al. |
| 2019/0052549 A1 | 2/2019 | Duggal et al. |
| 2019/0197654 A1* | 6/2019 | Hoppert ............... G06F 9/45529 |
| 2019/0250996 A1 | 8/2019 | Shiihara |
| 2019/0354331 A1 | 11/2019 | Neugarten et al. |
| 2019/0354402 A1 | 11/2019 | Bivens et al. |
| 2020/0127861 A1 | 4/2020 | Doshi et al. |
| 2020/0174838 A1 | 6/2020 | Li et al. |
| 2020/0241928 A1 | 7/2020 | Senevirathne et al. |
| 2020/0401491 A1 | 12/2020 | Mohamed et al. |
| 2021/0056509 A1 | 2/2021 | Lindy |
| 2021/0064405 A1 | 3/2021 | Ashkar et al. |
| 2021/0133622 A1 | 5/2021 | Nidd et al. |
| 2021/0192535 A1 | 6/2021 | Lee et al. |
| 2021/0314379 A1 | 10/2021 | Sodagar |
| 2021/0392056 A1 | 12/2021 | Duggal et al. |
| 2022/0012093 A1 | 1/2022 | Crabtree et al. |
| 2022/0058556 A1 | 2/2022 | Warake et al. |
| 2022/0067851 A1 | 3/2022 | Sinha et al. |
| 2022/0150307 A1 | 5/2022 | Walsh et al. |
| 2022/0237014 A1* | 7/2022 | Kurkure .................... G06T 1/20 |
| 2023/0036900 A1* | 2/2023 | Liguori .............. G06Q 10/0633 |

* cited by examiner

METHOD AND SYSTEM FOR MANAGING ACCELERATOR POOLS TO PERFORM SUBPORTIONS OF PORTIONS OF WORKFLOWS

BACKGROUND

Computing devices often exist in complex ecosystems of devices in which data exists and/or is generated. Such data may be used and/or operated on to produce any number of results. Such operations are often performed by workflows that include any number of services, each using any number of applications, modules, etc. It may be advantageous to deploy all or portions of such workflows within certain portions of the ecosystem of devices. However, as the complexity of such an ecosystem increases (e.g., more data, more devices, etc.), it may become difficult to determine where to deploy workflows, and how to efficiently do so once an execution environment is determined.

SUMMARY

In general, certain embodiments described herein relate to a method for managing workflows. The method may include obtaining, from a client, by a registration manager associated with accelerator pools, a request to perform a portion of a workflow using accelerators; identifying a minimum quantity and a maximum quantity of accelerators associated with the request; identifying a storage to store data associated with the portion of the workflow; identifying an accelerator pool of the accelerator pools that includes at least the maximum quantity of accelerators; establishing a connection between the client, the storage, and accelerators of the accelerator pool to perform the portion of the workflow; and initiating the performance of the portion of the workflow using the storage, the client, and the accelerators of the accelerator pool.

In general, certain embodiments described herein relate to a non-transitory computer readable medium that includes computer readable program code, which when executed by a computer processor enables the computer processor to perform a method for managing workflows. The method may include obtaining, from a client, by a registration manager associated with accelerator pools, a request to perform a portion of a workflow using accelerators; identifying a minimum quantity and a maximum quantity of accelerators associated with the request; identifying a storage to store data associated with the portion of the workflow; identifying an accelerator pool of the accelerator pools that includes at least the maximum quantity of accelerators; establishing a connection between the client, the storage, and accelerators of the accelerator pool to perform the portion of the workflow; and initiating the performance of the portion of the workflow using the storage, the client, and the accelerators of the accelerator pool.

In general, certain embodiments described herein relate to a system for deploying workflows. The system may include an accelerator pool that includes accelerators. The system may also include a registration manager associated with the accelerator pool, that includes a processor and memory, and is configured to obtain, from a client, a request to perform a portion of a workflow using accelerators; identify a minimum quantity and a maximum quantity of accelerators associated with the request; identify a storage to store data associated with the portion of the workflow; identify an accelerator pool of the accelerator pools that includes at least the maximum quantity of accelerators; establish a connection between the client, the storage, and accelerators of the accelerator pool to perform the portion of the workflow; and initiate the performance of the portion of the workflow using the storage, the client, and the accelerators of the accelerator pool.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
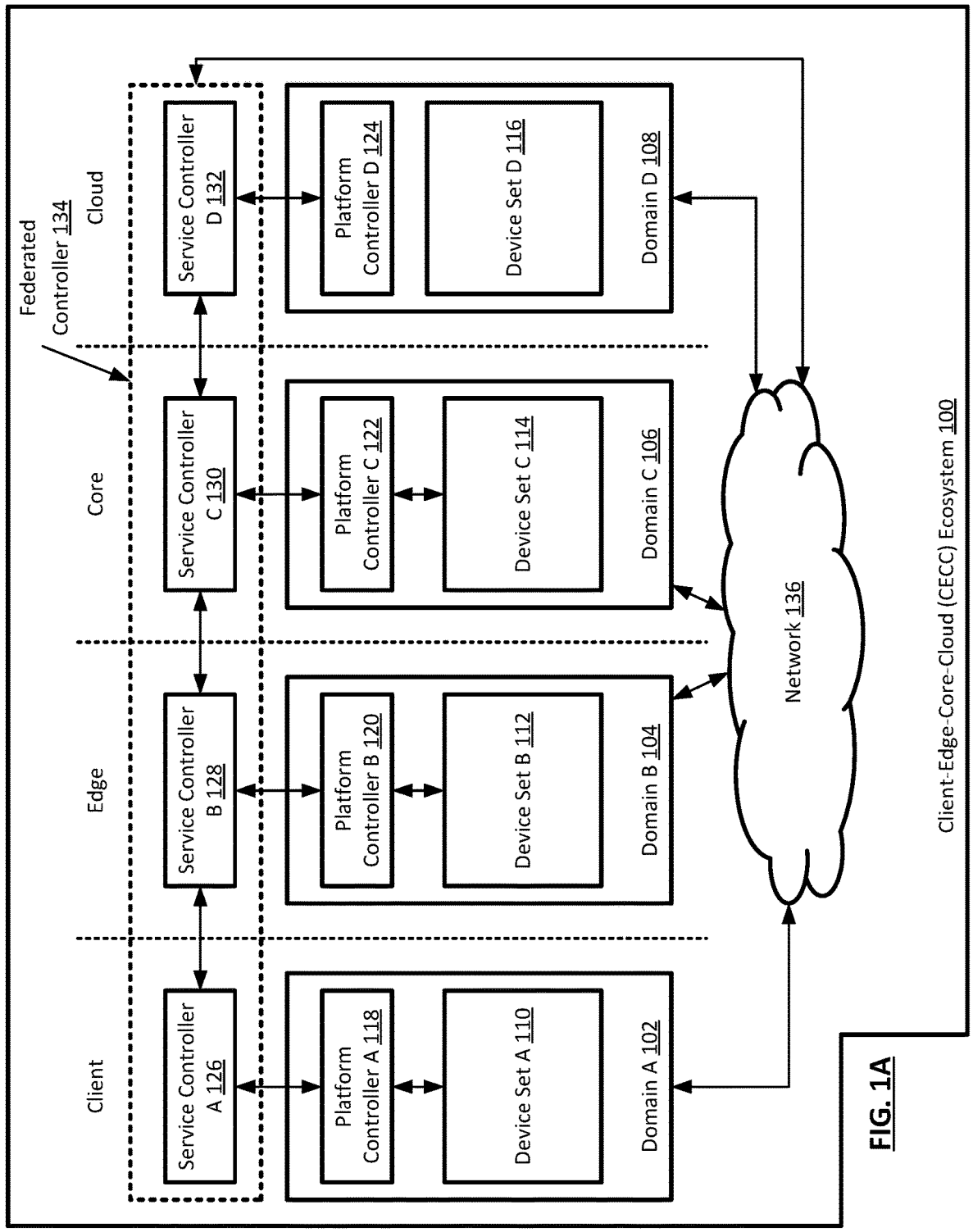
FIG. 1A shows a diagram of a system in accordance with one or more embodiments of the invention.

Specific embodiments will now be described with reference to the accompanying figures.

In the below description, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments described herein relate to methods, systems, and non-transitory computer readable mediums storing instructions for provisioning workflows, or portions thereof, using accelerator pools.

In one or more embodiments, as device ecosystems grow in size and complexity (e.g., from cloud to core to edge to client), connecting more diverse devices generating more data, the need to be able to inventory and characterize the connectivity is required in order to support complex workflows. In one or more embodiments, as the overall application workflow extends within a device ecosystem to capture, process, analyze, or otherwise use data, fitting the services of the application workflow to the capabilities of the various portions of the ecosystem is required. Such fitting may allow for meeting the service level objectives (SLOs) for the application workflow and the services used in building the workflow, which may be achieved by provisioning work to portions of the ecosystem having necessary capabilities, capacity, and/or data, using mapping relationships between devices. In one or more embodiments, the device ecosystem from client to edge to core to cloud can be mapped into a graph, database, etc., with elements discovered and relationships established and maintained for queries made to determine where one or more portions of a given workflow should be deployed.

Such a graph or database may include ecosystem information in various levels of abstraction. For example, each portion of an ecosystem (e.g., client, far edge, near edge, core, cloud, etc.) may have one or more service controllers. In one or more embodiments, the services controllers operate collectively as a federated controller for the ecosystem. Additionally, in one or more embodiments, each domain within a given portion of an ecosystem may have a platform controller.

In one or more embodiments, the service controllers receive, from platform controllers in their ecosystem portion, capabilities and capacity information, and also receive the same from other service controllers in the federated controller for their respective one or more platform controllers. Such capability and capacity information shared among the service controllers of the federated controller, along with information related to connectivity between different portions of the ecosystem, may be one level of the graph/database of the ecosystem.

In one or more embodiments, each platform controller in an ecosystem obtains and stores more detailed information of the device set of the domain with which it is associated, including, but not limited to, details related to topology, connection bandwidth, processors, memory, storage, data stored in storage, network configuration, accelerators (e.g., graphics processing units (GPUs)), deployed operating systems, programs and applications, etc. In one or more embodiments, the more detailed information kept by the various platform controllers represents a different layer of the graph or database of the ecosystem. Thus, in one or more embodiments, the service controllers of the federated controller of an ecosystem have a map of the capabilities and capacity of the various portions of the ecosystem, while the underlying platform controllers have a more detailed map of the actual resources within a given domain device set with which they are associated.

In one or more embodiments, any service controller of the federated controller of an ecosystem may receive a request to execute a workflow (e.g., from a console accessing the service controller). In one or more embodiments, the workflow may be received as or transformed into a directed acyclic graph (DAG). For example, a workflow may be received as a YAML Ain't Markup Language (YAML) file that is a manifest representing a set of interconnected services. In one or more embodiments, the service controller decomposes the DAG into workflow portions, such as services required, data needed, etc. In one or more embodiments, one or more such workflow portions may be identified as an anchor point. In one or more embodiments, the service controller then queries the graph (e.g., by performing a depth first or breadth first search) or database (e.g., using database query techniques) representing the ecosystem to determine what portion of the ecosystem is appropriate for the one or more anchor points (e.g., where the necessary data is or is generated from, where the infrastructure exists to execute a given service, etc.).

In one or more embodiments, once the anchor point has been identified, the service controller may then map it to the appropriate ecosystem portion, and map the other services of the workflow to portions of the ecosystem relative to the anchor point, thereby minimizing the cost of data transfer as much as is possible. In one or more embodiments, the various workflow portions are then provided to platform controllers of the domains to which the workflow portions were mapped, along with any related constraints derived from the workflow or SLO of the workflow.

In one or more embodiments, upon receiving the workflow portions and constraints from the service controller, platform controllers configure devices of domains in the ecosystem, including clients and registration managers, to execute portions of the workflow using accelerator pools. In one or more embodiments, once the devices are configured, the devices begin executing the workflow.

In one or more embodiments, a client configured to perform a workflow portion using accelerators sends a request to perform the workflow portion to a registration manager. In one or more embodiments, the request specifies a minimum quantity of accelerators and a maximum quantity of accelerators required to perform the workflow portion. In one or more embodiments, the minimum quantity of accelerators and the maximum quantity of accelerators are logical quantities of accelerators. In one or more embodiments, the maximum quantity of accelerators specifies what the workflow portion was created to use and the minimum quantity of accelerators specifies the minimum quantity of accelerators the workflow portion is able to use in order to execute the workflow portion to meet constraints specified by the request. In one or more embodiments, the registration manager identifies an accelerator pool that includes at least the maximum quantity of accelerators as specified by the request. In one or more, embodiments, the registration manager identifies, based on the request, a storage to use to perform the workflow portion. In one or more embodiments, the registration manager virtualizes and/or identifies the virtual instances of the accelerators corresponding to the identified accelerator pool that equal the maximum quantity of accelerators specified by the request and establishes a connection between the client, the storage, and the accelerators of the accelerator pool.

In one or more embodiments, the client and the accelerators of the accelerator pool perform subportions of the workflow portion using data stored in the storage. In one or more embodiments, after performing a subportion of the workflow portion, the entity that performed the subportion of the workflow, (i.e., the client or the accelerators of the accelerator pool) generates a tag associated with the data stored in the storage. In one or more embodiments, the tag includes information associated with the data stored in the storage including references associated with the data. In one or more embodiments, the entity that generated the tag then sends the tag to another entity, which passes control of the storage to the entity that receives the tag. In one or more embodiments, once execution of the workflow portion begins or the client performs or initiates the performance of the first subportion of the workflow portion, an entity (e.g., a server associated with an accelerator pool, a client, etc.) does not access the storage unless it obtains a tag that passes control to the entity.

FIG. 1A shows a diagram of a system in accordance with one or more embodiments described herein. The system may include client-edge-core-cloud (CECC) ecosystem (100). CECC ecosystem (100) may include domain A (102), domain B (104) domain C (106) and domain D (108). Domain A (102) may include platform controller A (118) and device set A (110). Domain B (104) may include platform controller B (120) and device set B (112). Domain C (106) may include platform controller C (122) and device set C (114). Domain D (108) may include platform controller D (124) and device set D (116). Domain A (102) may be operatively connected to (or include) service controller A (126). Domain B (104) may be operatively connected to (or include) service controller B (128). Domain C (106) may be operatively connected to (or include) service controller C (130). Domain D (108) may be operatively connected to (or include) service controller D (132). Service controller A (126), service controller B (128), service controller C (130), and service controller D (132) may collectively be federated controller (134). All or any portion of any device or set of devices in CECC ecosystem (100) may be operatively connected to any other device or set of devices via network (136). Each of these components is described below.

In one or more embodiments, CECC ecosystem (100) may be considered a hierarchy of ecosystem portions. In the example embodiment shown in FIG. 1A, CECC ecosystem (100) includes a client portion, an edge portion, a core portion, and a cloud portion. However, CECC ecosystem (100) is not limited to the exemplary arrangement shown in FIG. 1A. CECC ecosystem (100) may have any number of client portions, each operatively connected to any number of edge portions, which may, in turn, be operatively connected to any number of core portions, which may, in turn, be connected to one or more cloud portions. Additionally, a given CECC ecosystem (100) may have more or less layers without departing from the scope of embodiments described herein. For example, the client portion may be operatively connected to the core portion, or the cloud portion, without an intervening edge portion. As another example, there may be a far edge portion and a near edge portion of ecosystem (100). One of ordinary skill in the art will recognize that there are many possible arrangements of CECC ecosystem (100) other than the example hierarchy shown in FIG. 1A.

In one or more embodiments, domain A (100) is a portion of CECC ecosystem (100) in the client portion of CECC ecosystem (100). Similarly, domain B (104), domain C (106) and domain D (108) are in the edge portion, the core portion, and the cloud portion, respectively.

In one or more embodiments, domain A (102) includes device set A (110). In one or more embodiments, device set A (110) includes any number of computing devices (not shown). In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors for obtaining data, and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), and/or any other type of device with the aforementioned requirements.

In one or more embodiments, any or all of the aforementioned examples may be combined to create a system of such devices. Other types of computing devices may be used without departing from the scope of the embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, such computing devices may be operatively connected to other computing devices of device set A (110) in any way, thereby creating any topology of computing devices within device set A (110). In one or more embodiments, one or more computing devices in device set A (110) may be operatively connected to any one or more devices in any other portion of CECC ecosystem (100). Such operative connections may be all or part of a network (136). A network (e.g., network (136)) may refer to an entire network or any portion thereof (e.g., a logical portion of the devices within a topology of devices). A network may include a data center network, a wide area network, a local area network, a wireless network, a cellular phone network, and/or any other suitable network that facilitates the exchange of information from one part of the network to another. A network may be located at a single physical location, or be distributed at any number of physical sites. In one or more embodiments, a network may be coupled with or overlap, at least in part, with the Internet.

In one or more embodiments, although shown separately in FIG. 1A, network (136) may include any number of devices within any device set (e.g., 110, 112, 114, and 116) of CECC ecosystem (100), as well as devices external to, or between, such portions of CECC ecosystem (100). In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the scope of embodiments described herein. Examples of a network device include, but are not limited to, a network switch, a router, a multilayer switch, a fibre channel device, an InfiniBand® device, etc. A network device is not limited to the aforementioned specific examples.

In one or more embodiments, a network device includes functionality to receive network traffic data units (e.g., frames, packets, tunneling protocol frames, etc.) at any of the network interfaces (i.e., ports) of a network device and to process the network traffic data units. In one or more embodiments, processing a network traffic data unit includes, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Examples network traffic data unit processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device. In one or more embodiments, network devices are configured to participate in one or more network protocols, which may include discovery schemes by which a given network device may obtain information about all or any of the network topology in which the network device exists. Such discovery schemes may include sharing of information between network devices, and may also include providing information to other devices within CECC ecosystem (100), such as, for example, service controllers and/or platform controllers (discussed below).

In one or more embodiments, any or all of the devices in device set A (110) may form one or more virtualization environments (not shown). In one or more embodiments, a virtualization environment is any environment in which any number of computing devices are subject, at least in part, to a shared scheme pooling compute resources for use in deploying virtualized computing device instances (e.g., VMs, containers, emulators, etc.), which may be used in any arrangement to perform all or any portion of any work requested within a domain.

In one or more embodiments, domain A (102) also includes platform controller A (118). In one or more embodiments, platform controller A (112) is any computing device (described above), or any portion of any computing device. In one or more embodiments, platform controller A (118) is executes as a service. In one or more embodiments, platform controller A (118) includes functionality to discover details of device set A (110). Such details include, but are not limited to: how devices are connected; what resources a device has (e.g., processors, memory, storage, networking, accelerators, etc.), how much capacity of a device or set of devices are used; what operating systems are executing on devices; how many virtual machines or other virtual computing instances exist; what data exists and where it is located; and/or any other information about devices in device set A (110).

In one or more embodiments, based on the information discovered by platform controller A (118) about device set A (110), platform controller A determines what capabilities device set A (110), or any portion thereof, may perform. In one or more embodiments, a capability is any one or more actions, operations, functionality, stored data, ability to obtain data from any number of data sources, compute resources to perform certain tasks, etc. Examples of capabilities include, but are not limited to, inference, training for machine learning, implementing in-memory databases, having a particular dataset (e.g., video and images from stores of a certain company in a certain region of the country), performing classification, data analysis, etc. Embodiments described herein are not limited to the aforementioned examples. In one or more embodiments, platform controller B (120), platform controller C (122, and platform controller D (124) are also computing devices (described above), and perform functionality similar to that of platform controller A (118) for their respective domains (i.e., domain B (104), domain C (106), and domain D (108)).

In one or more embodiments, each domain (e.g., 102, 104, 106, and 108) in CECC ecosystem (100) includes a device set (e.g., 110, 112, 114, and 116) and a platform controller (e.g., 118, 120, 122, and 124). In one or more embodiments, each device set is a set of computing devices, such as is discussed above in the description of device set A. However, the set of computing devices in different device sets may be different, and may be particular to the portion (e.g., client, edge, cloud, core) of CECC ecosystem (100) that the device set is in. For example, the client portion of CECC ecosystem (100) may include sensors collecting data, controllers controlling the sensors, desktop devices, mobile computing devices, etc. Other data sets may include different computing devices. For example, the edge portion of CECC ecosystem (100) may have a device set that include servers with more compute ability than devices in the client portion. Similarly, the core portion of CECC ecosystem (100) may include more powerful devices (e.g., having more compute resources), a greater quantity of more powerful devices, specific architectures of sets of devices for performing certain tasks, etc. Also similarly, the cloud portion of CECC ecosystem (100) may include still more and different devices configured and deployed in different ways than the other portions of CECC ecosystem (100).

Additionally, although not shown in FIG. 1A, CECC ecosystem (100) may be arranged in a hierarchy. For example, a single cloud portion may be operatively connected to any number of core portions, each of which may be connected to any number of edge portions, each of which may be connected to any number of client portions. The particular device set (110, 112, 114, 116) in any given portion of CECC ecosystem (100) may determine what capabilities the domain (102, 104, 106, 108) in which the device set exists is suited to perform, which is known to and/or determined by the platform controller for the domain (102, 104, 106, 108).

In one or more embodiments, each platform controller (118, 120, 122, and 124) is operatively connected to a respective service controller (126, 128, 130, and 132). In one or more embodiments, each service controller (126, 128, 130, and 132) is a computing device, such as is discussed above in the description of device set A (110). Any portion of CECC ecosystem (100) may include any number of service controllers (126, 128, 130, 132), each of which may be operatively connected to any number of platform controllers (118, 120, 122, 124) in any number of domains (102, 104, 106, 108) in a given ecosystem portion (e.g., client, edge, cloud, core). In one or more embodiments, each service controller (126, 128, 130, and 132) is also operatively connected to the other service controllers (126, 128, 130, and 132) in CECC ecosystem (100). In one or more embodiments, the operatively connected service controllers (126, 128, 130, and 132) of CECC ecosystem (100) form federated controller (134) for CECC ecosystem (100). In one or more embodiments, federated controller (134) functions as a distributed service for deploying workflows within CECC ecosystem (100). In one or more embodiments, any service controller of federated controller (134) may be accessed to request provisioning of a workflow. In one or more embodiments, each service controller (126, 128, 130, 132) receives, from operatively connected platform controllers within the same portion of CECC (100), information about what capabilities underlying device sets of a domain can perform, how much capacity is available on the device set within a given domain (which may be updated on any update schedule), and/or any other information or metadata that may be useful to determine whether a portion of a workflow should be or can be provisioned within a given domain. In one or more embodiments, each service controller of federated controller (134) also shares the information with each other service controller of federated controller (134). Collectively, the shared information may be organized as a graph, or database, or any other data construct capable of storing such information and being queried to find such information. Such a graph or database may be a distributed data construct shared between the collection of service controllers of federated controller (134).

While FIG. 1A shows a configuration of components, other configurations may be used without departing from the scope of embodiments described herein. Accordingly, embodiments disclosed herein should not be limited to the configuration of components shown in FIG. 1A.

Figure 1B:
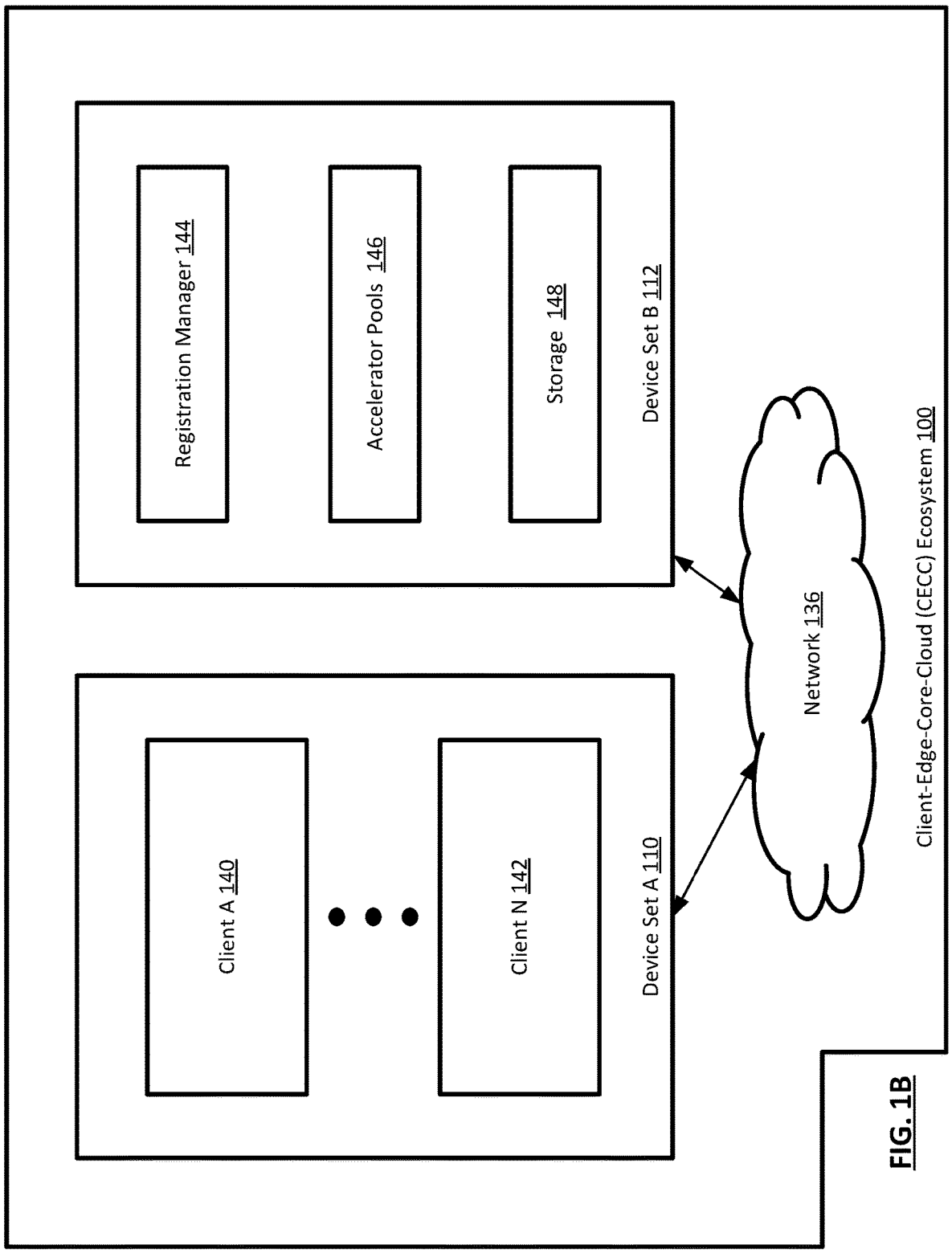
FIG. 1B shows a diagram of a system in accordance with one or more embodiments of the invention.

FIG. 1B shows a diagram of a system in accordance with one or more embodiments described herein.

FIG. 1B shows a diagram of a system in accordance with one or more embodiments described herein. The system may include the CECC ecosystem (100) discussed above in FIG. 1A. The system may further include device set A (110) and device set B (112) connected through the network (136) as discussed above. Both device sets (110, 112) may be embodiments of the device sets (e.g., device set A (110), device set B (112), device set C (114), and device set D (116) discussed above in FIG. 1A. Device set A (110) and device set B (112) may be included in domains of any of the client portion, the edge portion, the core portion, and/or the cloud portion without departing from embodiments discussed herein. For example, device set A (110) may be a device set of a domain included in the edge portion of the CECC ecosystem (100) and device set B (112) may be a device set of a domain included the core portion of the CECC ecosystem (100).

In one or more embodiments, device set A (110) may include one or more clients. Device set A (110) may include client A (140) and client N (142). The clients (140, 142) may be implemented as the one or more computing devices discussed above in FIG. 1A, each configured to perform a portion of a workflow using accelerators of an accelerator pool (discussed below). The clients (140, 142) may include the functionality to send requests to a registration manager (144) (discussed below) to perform portions of workflows using accelerators of an accelerator pool. The requests may specify a minimum quantity of accelerators and a maximum quantity of accelerators required to perform portions of workflows. In one or more embodiments, the minimum may be the minimum number of accelerators required to perform a given workflow portion. In one or more embodiments, the maximum may be a quantity of accelerators preferred, if available, for any relevant purpose. For example, a given workflow portion may need to be performed using an application written with an assumption that a certain number of accelerators are available for executing the application. The minimum quantity of accelerators and maximum quantity of accelerators may be specified by users of the CECC ecosystem when provisioning workflows in the CECC ecosystem (100). For example, the YAML file obtained by a service controller may specify the minimum quantity and maximum quantity of accelerators to perform a portion of a workflow. The service controller may select a platform controller corresponding to a domain associated with a device set A (110) which may provide the minimum quantity and maximum quantity of accelerators to the clients (140, 142) when configuring the clients (140, 142) to perform the workflow portions. The clients (140, 142) may further include the functionality to perform workflow portions using accelerators of the accelerator pools. The clients (140, 142)

may include other and/or additional functionality without departing from embodiments of the invention disclosed herein.

In one or more embodiments, device set B (112) may include a registration manager (144), accelerator pools (146), and storage (148). The registration manager (144) may be implemented as the one or more computing devices of device set B (112) as discussed above in FIG. 1A. The registration manager (144) may be configured to manage the accelerator pools (146). To manage the accelerator pools (146), the registration manager (144) may include the functionality to (i) obtain requests from clients (140, 142) to perform workflow portions using accelerators of the accelerator pools (146), (ii) identify accelerator pools that include at least the maximum quantity of accelerators associated with requests, (iii) establish connections between clients (140, 142) and accelerators of accelerator pools (146) by virtualizing, or initiating the virtualization through a hypervisor or other virtual managing entity, the accelerators and presenting the virtual accelerators to the clients (140, 142), and (iv) generate and/or otherwise assign portions of workflows to time-sliced portions of the virtual accelerators of the accelerator pools (146). The registration manager (144) may include other and/or additional functionality without departing from embodiments of the invention disclosed herein.

In one or more embodiments, a time-sliced portion of accelerators of an accelerator pool associated with a workflow may be a portion of time a workflow portion that is allocated to execute on the accelerators of an accelerator pool. For example, a workflow specifying a maximum quantity of four accelerators and a minimum quantity of two accelerators may be assigned, by the registration manager (144) to an accelerator pool that includes four accelerators. The registration manager (144) may assign a 100% time-sliced portion of the accelerators in the accelerator pool in which the each accelerator in the accelerator pool performs the workflow 100% of the time and the client (140) perceives the workflow as being performed by four virtual accelerators. In another example, the registration manager (144) may assign a 50% time-sliced portion of the accelerators in the accelerator pool in which the each accelerator in the accelerator pool performs the workflow 50% of the time, and performing another workflow(s) the other 50% of the time, and the client (140) perceives the workflow is being performed by two virtual accelerators.

In one or more embodiments, the accelerator pools (146) may be one or more groupings of accelerators included on any number of computing devices of device set B (112). There may be any number of accelerator pools in the accelerator pools (146). Each accelerator pool of the accelerator pools (146) may include any number of accelerators. For example, a first accelerator pool may include four accelerators, a second accelerator pool may include eight accelerators, and a third accelerator pool may include twelve accelerators. In one or more embodiments, an accelerator is a graphics processing unit (GPU) or an FPGA. The accelerators may be other types of devices that include improved computing capabilities compared to other devices (e.g., a central processing unit). The accelerator pools (146) may include any number of types of accelerators (e.g., different types of GPUs) without departing from embodiments of the invention disclosed herein. In one or more embodiments, the accelerators of the accelerator pools (146) include the functionality to perform workflow portions. To perform workflow portions, the accelerator pools may communicate with and transmit information to clients (140, 142) and read and write data to storages within the CECC ecosystem (100).

The accelerators of the accelerator pools (146) may include other and/or additional functionality without departing from embodiments of the invention disclosed herein.

In one or more embodiments, the storage (148) may be implemented as one or more computing devices of device set B (112) or any other device set (e.g., 110) that includes non-volatile storage and/or memory as discussed above. The storage (148) may store data used by both clients (140, 142) and accelerators of accelerator pools (146) to perform workflow portions. In one or more embodiments, the storage (148) stores any quantity of data in any form accessible by both clients (140, 142) and accelerators of accelerator pools (146). Data may be read from and/or written to the storage (148) during the performance of the workflow portions by the clients and/or accelerators of the accelerator pool. Control of the storage (148) may be passed from the clients (140, 142) to the accelerators of the accelerator pools (146) by generating and sharing tags between the clients (140, 142) and the accelerators of the accelerator pools (146). A tag may be a data structure generated by a client (e.g., 140) or accelerators of an accelerator pool that include information associated with data stored in the storage (148). The information may include references (e.g., pointers) to data stored in storage, operations performed to the data, timestamps associated with points in time in which the aforementioned operations were performed, and any other additional information associated with the data stored in the storage (148) without departing from embodiments of the invention disclosed herein. Control of the storage (148) is passed from the entity sending the tag to the entity obtaining the tag. For example, a client (e.g., 140) may generate and send a tag to the accelerators of an accelerator pool. Upon sending the tag, the client may not modify the data stored in the storage (148) until obtaining another tag from the accelerators of the accelerator pool.

While FIG. 1B shows a configuration of components, other configurations may be used without departing from the scope of embodiments described herein. Accordingly, embodiments disclosed herein should not be limited to the configuration of components shown in FIG. 1B.

While FIG. 1B shows a configuration of components, other configurations may be used without departing from the scope of embodiments described herein. Accordingly, embodiments disclosed herein should not be limited to the configuration of components shown in FIG. 1B.

Figure 2A:
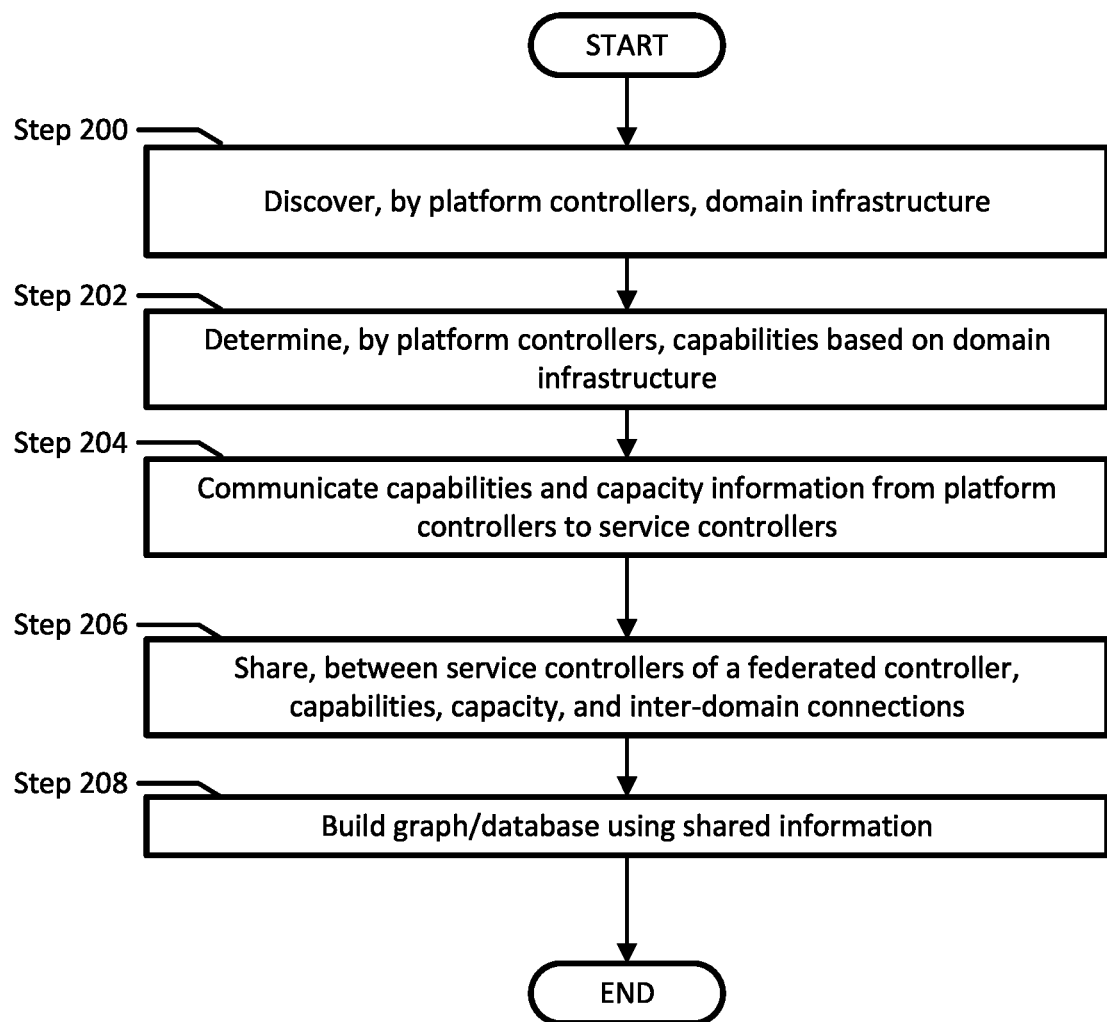
FIG. 2A shows a flowchart in accordance with one or more embodiments of the invention.

FIG. 2A shows a flowchart describing a method for discovering and obtaining information about an ecosystem of devices to be stored in a data construct for future queries when provisioning workflows in accordance with one or more embodiments disclosed herein.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, each platform controller in a given ecosystem discovers information about the device set in the domain in which the platform controller exists. Such information may include the topology of the devices, the computing resources of the devices, configuration details of the devices, operating systems executing on the devices, the existence of any number of virtualized computing device instances, the storage location of any number of datasets are stored, how much of the capacity of any one or more devices is being used and/or has available, etc.

In one or more embodiments, any mechanism or scheme for discovering such information may be used, and any number of different mechanisms and/or schemes may be used to obtain various types of information. For example, the platform controller may request virtualization infrastructure information from one or more virtualization controllers, determine domain network topology by participating in and/or receiving information shared among domain network devices pursuant to one or more routing protocols, perform queries to determine quantity and type of processors, amount of memory, quantity of GPUs, amount of storage, number of network ports, etc. for servers, determine what type of information is being collected and/or processed by various sensors, controllers, etc., determine where datasets of a particular type or purpose are stored by communicating with one or more storage controllers, etc. Any other form of discovery may be performed by the platform controllers without departing from the scope of embodiments described herein.

In Step 202, based on the information discovered in Step 200, a given platform controller determines what capabilities the device set of a domain has. In one or more embodiments, determination of the capabilities of the device set, or any portion thereof, may be performed in any manner capable of producing one or more capabilities that a given device set, connected and configured in a particular way, may perform. For example, the platform controller may execute a machine learning algorithm that has been trained to identify certain capabilities of a domain set based on the set of information about a given device set of a domain.

In Step 204, the capabilities of the domain determined in Step 202 are communicated from the platform controller to an operatively connected service controller, along with information about the currently available capacity of the domain. For example, a platform controller may communicate to a service controller that the domain has the capability to perform inference, to analyze data in a particular way, to train certain types of machine learning algorithms, has the sensors to obtain certain types of data, etc. At the same time, the platform controller may also communicate, for example, that currently 27% of the resources of the domain, or any potion therein, are available to perform additional work. In one or more embodiments, the platform controller may also communicate any other information about the domain to the service controller, such as that the domain has (or has sensors to obtain) particular datasets that may be used for particular purpose (e.g., training a certain type of machine learning algorithm).

In Step 206, each of the service controllers of the federated controller of an ecosystem shares the capabilities, capacity, and other information with each other. Sharing information may include sending some or all of the information to the other service controllers, and/or storing the information in a location that is commonly accessible by the service controllers. In one or more embodiments, the service controllers also share information about how the different portions of the ecosystem are operatively connected. For example, the service controllers may use information gained from devices executing a border gateway protocol (BGP) to obtain topology information for the ecosystem.

In Step 208, the federated controller of the ecosystem builds a graph or database using the information communicated from the platform controllers in Step 204, or otherwise obtained and shared in Step 206. In one or more embodiments, the graph or database is stored as a distributed data construct by the service controllers of the federated controllers, and may be distributed in any way that a set of information may be divided, so long as it is collectively accessible by each of the service controller of the federated controller. In one or more embodiments, the graph or database is stored in a form which may be queried to find information therein when determining how to provision portions of a workflow for which execution is requested. Receiving a request to execute a workflow, querying the graph or database, and provisioning the workflow portions to various domains in the various portions of the ecosystem are discussed further in the description of FIG. 2B, below.

Figure 2B:
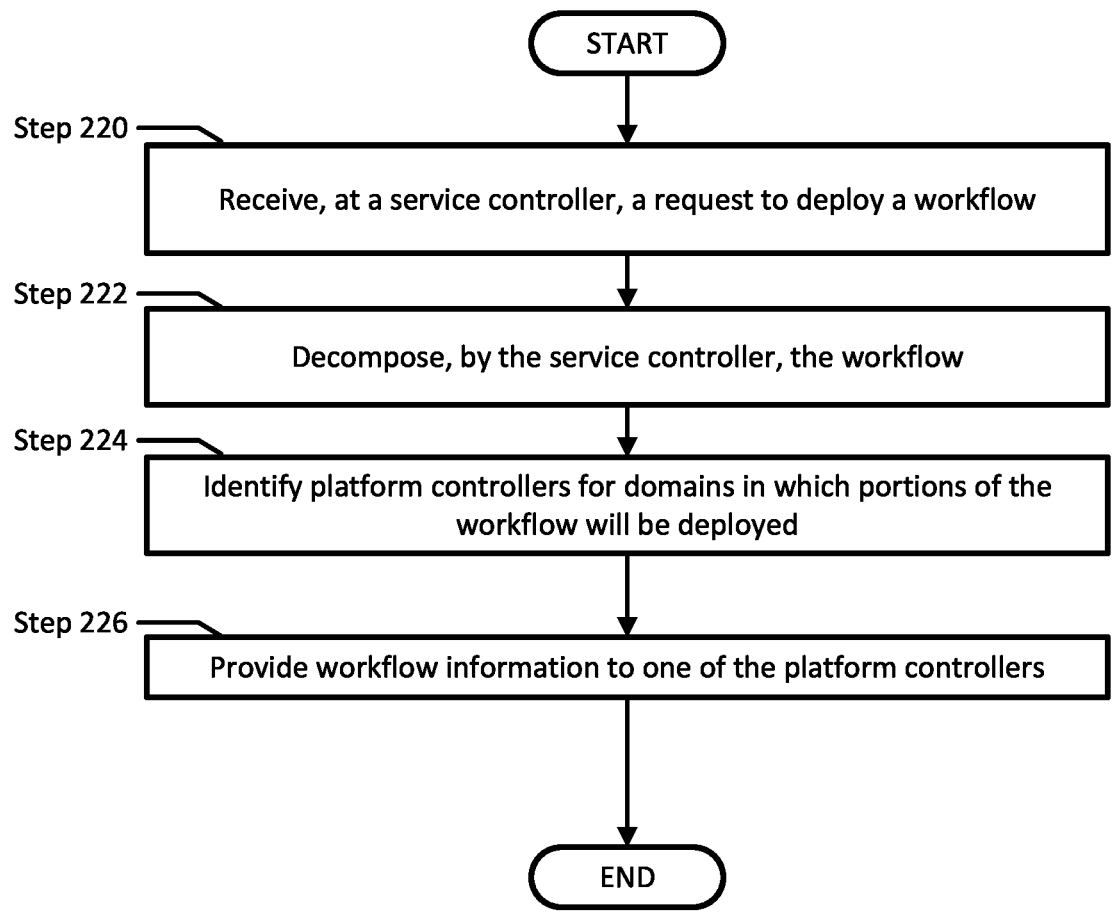
FIG. 2B shows a flowchart in accordance with one or more embodiments of the invention.

FIG. 2B shows a flowchart describing a method for provisioning workflows within a device ecosystem in accordance with one or more embodiments disclosed herein.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 220, a request to deploy a workflow is received at a service controller of a federated controller of a device ecosystem. In one or more embodiments, the request is received in any form that conveys, at least, requirements and constraints for performing the workflow. Constraints may be based, at least in part, on an SLO associated with the workflow between the entity requesting execution of the workflow and the entity providing the ecosystem in which the workflow will be deployed. Requirements may include that the workflow will require certain amounts and/or types of compute resources of an ecosystem of devices, require certain data be available and/or obtained, require that certain technologies for data transfer be used (e.g., low latency network solutions), etc. In one or more embodiments, the request is received in a form that can be understood as or converted to a DAG. For example, the request may be received in the form of a YAML file that is a manifest of the interconnected services of a workflow. The request may be received at a service controller through any form of communicating with a computing device. For example, a user may be provided with access to a cloud console that is configured to access one or more service controllers of a CECC ecosystem.

In Step 222, the service controller decomposes the workflow. In one or more embodiments, decomposing the workflow includes identifying various workflow portions, such as services to be executed, data to be used and/or obtained, etc. In one or more embodiments, decomposing a workflow includes expressing the workflow as a DAG. A given workflow may include any number of workflow portions. As an example, a workflow may be a single service. As another example, a workflow may be any number of services that are in an ordered relationship with any number of interrelated dependencies between them. In one or more embodiments, decomposing a workflow includes identifying one or more anchor points of the workflow. In one or more embodiments, an anchor point is any workflow portion that can be identified as requiring a specific placement within the device ecosystem in which the workflow is to be deployed. As an example, an anchor point may be a particular dataset that is needed (e.g., for training a machine learning algorithm) that is stored in a certain storage location within the ecosystem. As another example, an anchor point may be a particular capability (e.g., inference, certain data analytics, etc.) that a workflow portion requires that may only be performed by domain device sets having particular characteristics. As another example, an anchor point may be the need for data acquired in a specific geographic region. Workflow portions other than the aforementioned examples may be identified without departing from the scope of embodiments described herein.

In Step 224, the service controller identifies one or more platform controllers in one or more domains in which the one or more workflow portions will be deployed. In one or more embodiments, the service controller identifies the one or more platform controllers and corresponding domains by performing a query to the set of information generated from the service controller's one or more underlying platform controllers and from the other service controllers of the federated controller, as is discussed above in the description of FIG. 2A. As an example, the capabilities, capacity, and operative connectivity of the various domains in the ecosystem may be organized as a graph, and the service controller may perform a breadth first or depth first search using the graph information structure. As another example, the capabilities, capacity, and operative connectivity of the various domains in the ecosystem may be organized as a database, and the service controller may perform a database query to find the information.

In one or more embodiments, the service controller first identifies where to deploy any anchor points identified in Step 222. Determining a domain in which an anchor point will be deployed may influence all or any portion of the deployment locations within the ecosystem for the other workflow portions identified in Step 222. In one or more embodiments, this is because the service controller may attempt to minimize the burden of data transfer within the ecosystem by placing the additional workflow portions in optimal locations relative to the placement of the anchor point workflow portion. For example, if the ecosystem includes a far edge portion where image data is being acquired at a certain physical location, a workflow portion for analyzing that data, at least in part, may be placed at a near edge portion of the ecosystem that is in relatively close physical proximity to the far edge portion, which may minimize the transmission times for the image data being obtained. In one or more embodiments, the service controller identifies domains in which to execute all portions of the decomposed workflow.

In Step 226, the service controller provides the workflow portions and related constraints (e.g., constraints derived from the SLO corresponding to the workflow) to the platform controllers identified in Step 224. In one or more embodiments, the workflow portion and constraints are provided directly to the platform controller(s) that are in the same ecosystem portion as the service controller. In one or more embodiments, other workflow portions and corresponding constraints are provided to the relevant platform indirectly (e.g., by way of the service controller in the ecosystem portion that the platform controller exists in). In one or more embodiments, the workflow portion and any corresponding constraints are provided to the platform controllers using any appropriate method of data transmission. As an example, the service controller may communicate the workflow portion details and corresponding constraints as network data traffic units over a series of network devices that operatively connect the service controller and the relevant platform controller. For additional information regarding provisioning workflow portions using accelerator pools and a storage shared between a client and the accelerators of the accelerator pool and executing the workflow portions by the clients and the accelerators of the accelerator pool using the shared storage, refer to FIGS. 2C and 2D, respectively.

Figure 2C:
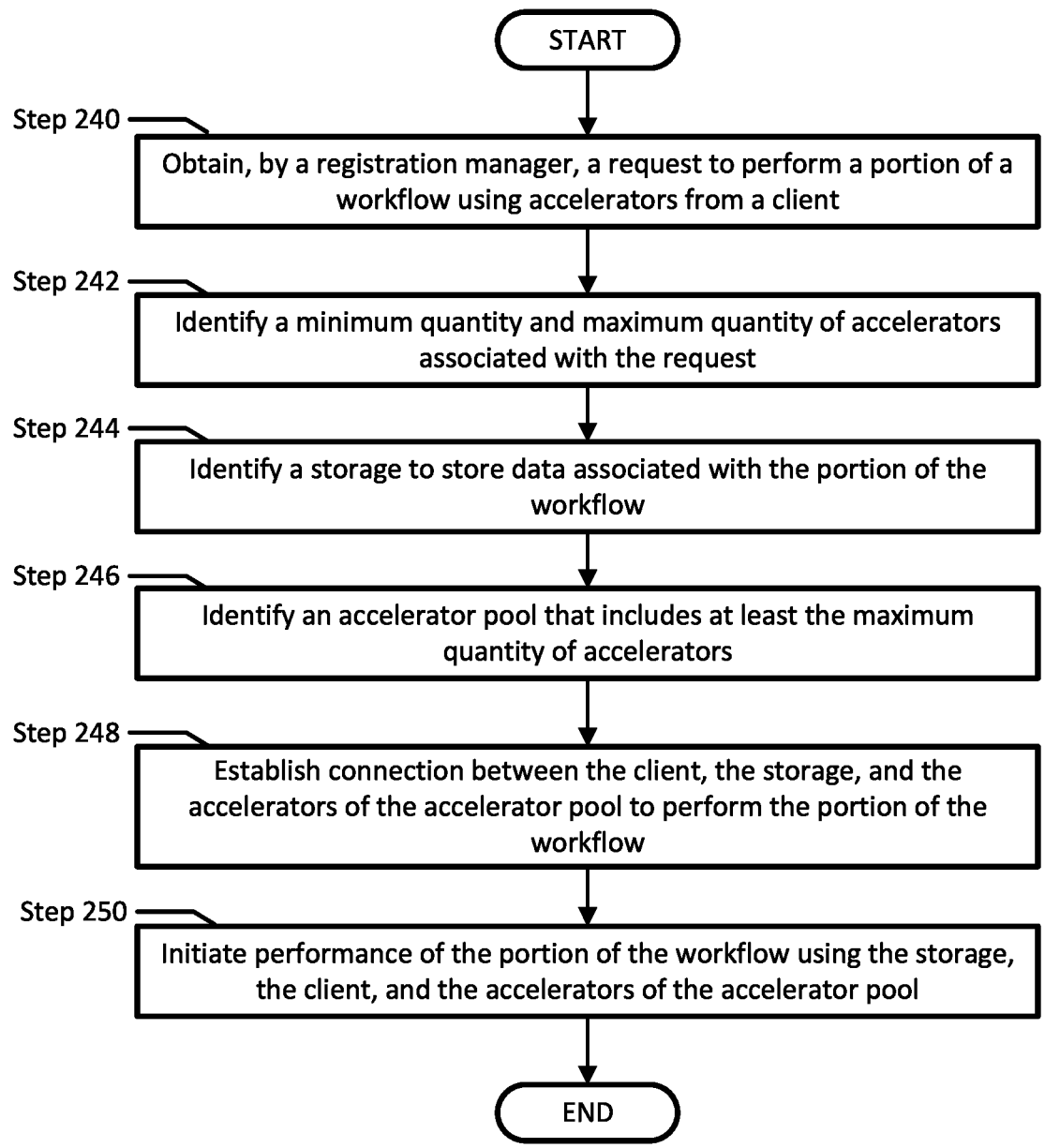
FIG. 2C shows a flowchart in accordance with one or more embodiments of the invention.

FIG. 2C shows a flowchart describing a method for provisioning workflows portions within a device ecosystem using accelerator pools, clients, and a shared storage in accordance with one or more embodiments disclosed herein.

While the various steps in the flowchart shown in FIG. 2C are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 240, a registration manager obtains, from a client, a request to perform a workflow portion using accelerators. In one or more embodiments, the client, after being configured to perform the workflow portion, sends the request to perform the workflow portion to the registration manager. In one or more embodiments, the request to perform the workflow portion is provided to the registration manager using any appropriate method of data transmission. As an example, the client may communicate the request to perform the workflow portion as network data traffic units over a series of network devices that operatively connect the client and the registration manager.

In Step 242, the registration manager identifies a minimum and maximum quantity of accelerators associated with the request. As discussed above, the request may include information regarding the workflow portion. The information may specify the minimum quantity of accelerators and the maximum quantity of accelerators associated with the workflow. The registration manager may identify the minimum quantity of accelerators and the maximum quantity of accelerators associated with the request using the information included in the request. The minimum quantity of accelerators may specify a minimum amount of virtual accelerators that are required to perform the workflow portion. The maximum quantity of accelerators may specify a maximum quantity of virtual accelerators to be used to perform the workflow portion.

In Step 244, the registration manager identifies a storage to store data associated with the workflow portion. In one or more embodiments, the registration manager identifies the storage based on the workflow information associated with the request to perform the workflow. The workflow information may specify a storage, a storage type, one or more computing devices with storage, the location of data to be used to perform the workflow portion and/or any other additional workflow information associated with the storage without departing from embodiments of the invention disclosed herein. For example, the workflow information may specify that the data to be used to perform the workflow portion is stored on a hard disk drive connected to the client through a network file system (NFS) or NVMe-oF. The registration manager may identify to use the hard disk drive as the storage.

In Step 246, the registration manager identifies an accelerator pool that includes at least the maximum quantity of accelerators. The registration manager may include and/or obtain access to accelerator pool information, which may, at least in part, be included in the capability and capacity information, which may be a data structure that specifies each accelerator pool of the accelerator pools, the number of accelerators included in each accelerator pool, the workflow portions associated with each accelerator pool, and the time-sliced portions of the accelerators assigned to each workflow portion associated with each accelerator pool. The registration manager may identify, using the accelerator pool information, an accelerator pool that has at least the maximum amount of accelerators and the capacity to perform the workflow portion. The registration manager may identify an accelerator pool that includes more than the maximum quantity of accelerators without departing from embodiments of the invention disclosed herein. For example, the accelerator pool information may specify that two accelerator pools include the capacity to perform the workflow portion, the first accelerator pool includes the capacity to provide more than the minimum quantity of accelerators but includes less than the maximum number of accelerators and the second accelerator pool includes the maximum quantity of accelerators. Based on the accelerator pool information, the registration manager may identify the second accelerator pool.

In Step 248, the registration manager establishes a connection between the client, the storage, and the accelerators of the accelerator pool to perform the portion of the workflow. In one or more embodiments, the registration manager establishes a connection between the client and the accelerators of the accelerator pool identified in Step 244 by virtualizing, or initiating the virtualization by a virtualization management entity associated with the accelerator pool, to obtain virtual accelerators. The virtualization of the accelerators of the accelerator pool may be performed using any appropriate method of virtualization to obtain virtual accelerators without departing from embodiments of the invention disclosed herein. Additionally, the registration manager may facilitate the connection of the storage to the accelerators of the accelerator pool and/or the client through any appropriate methods such as through a NFS.

In Step 250, the registration manager initiates the performance of the workflow using the storage, the client, and the accelerators of the accelerator pool. In one or more embodiments, the registration manager may provide accelerator information and storage information associated with accelerators of the accelerator pool to the client, which when obtained, enable the client to perform the workflow portion using the virtual accelerators of the accelerator pool. The accelerator information may include accelerator identifiers that specify each accelerator, device information associated with the computing devices associated with the accelerators (virtualization management entity), etc. The storage information may specify the storage device, a connection associated with the storage device such as NFS information, etc. The registration manager may, if the data to be used to perform the workflow portion resides in a different location than the storage, move or initiate the movement of the data to the storage. Once obtained by the client, the client may begin performing the workflow portion using the assigned time-sliced portion of the accelerators of the accelerator pools and the storage.

Figure 2D:
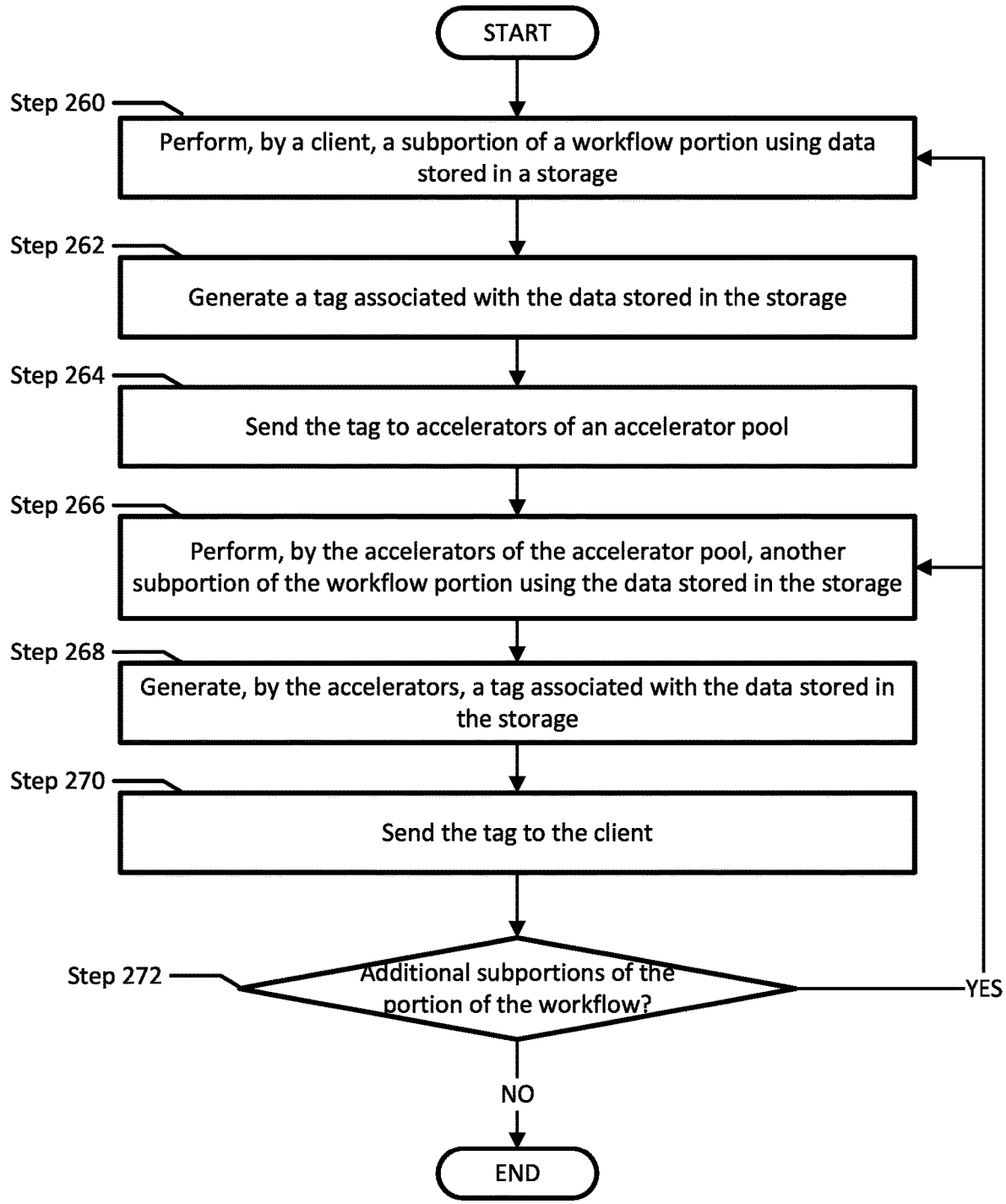
FIG. 2D shows a flowchart in accordance with one or more embodiments of the invention.

FIG. 2D shows a flowchart describing a method for performing a workflow portion within a device ecosystem using an accelerator pool, a client, and a shared storage in accordance with one or more embodiments disclosed herein.

While the various steps in the flowchart shown in FIG. 2D are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 260, a client performs a subportion of a workflow portion using data stored in a storage. In one or more embodiments, the workflow portion includes any number of subportions of the workflow portion. The client may perform any number of operations on data stored in the storage during the performance of the subportion of the workflow portion. The operations may include modifying data stored in the storage, adding data to the storage, moving data in the storage, deleting data from the storage, and other and/or additional operations associated with data stored in the storage without departing from embodiments of the invention disclosed herein. In one or more embodiments, performing a subportion of the workflow portion may include initiating the performance of the subportion of the workflow portion by the accelerators of the accelerator pool.

In Step 262, the client generates a tag associated with the data stored in the storage. In one or more embodiments, the client generates a data structure that includes the tag. The tag may include information associated with the data stored in the storage as discussed above. The information may include references (e.g., pointers) to data stored in storage, operations performed, by the client, to the data, timestamps associated with points in time in which the aforementioned operations were performed, details associated with the performance of a next subportion of the workflow portion by the accelerators of the accelerator pool, any other additional information associated with the data stored in the storage (148) without departing from embodiments of the invention disclosed herein.

In Step 264, the tag is sent to the accelerators of the accelerator pool. In one or more embodiments, the tag is sent to the accelerators of the accelerator pool using any appropriate method of data transmission. As an example, the client may communicate the tag as network data traffic units over a series of network devices that operatively connect the client and the accelerators of the accelerator pool.

In Step 266, the accelerators perform another subportion of the workflow portion using the data stored in storage. In one or more embodiments, the accelerators of the accelerator pool perform the subportion of the workflow portion based on directions obtained from the client. The accelerators of the accelerator pool may perform any number of operations on data stored in the storage during the performance of the subportion of the workflow portion. The operations may include modifying data stored in the storage, adding data to the storage, moving data in the storage, deleting data from the storage, and any other additional operations associated with data stored in the storage without departing from embodiments of the invention disclosed herein.

In Step 268, the accelerators of the accelerator pool generate a tag associated with the data stored in the storage. In one or more embodiments, the accelerators of the accelerator pool generate a data structure that includes the tag. The tag may include information associated with the data stored in the storage as discussed above. The information may include may include references (e.g., pointers) to data stored in storage, operations performed, by the accelerators of the accelerator pool, to the data, timestamps associated with points in time in which the aforementioned operations were performed, and any other additional information associated with the data stored in the storage (148) without departing from embodiments of the invention disclosed herein.

In Step 270, the tag is sent to the client. In one or more embodiments, the tag is sent to the client using any appropriate method of data transmission. As an example, the accelerators of the accelerator pool may communicate the tag as network data traffic units over a series of network devices that operatively connect the accelerators of the accelerator pool and the client.

In Step 272, a determination is made as to whether there are additional subportions of the workflow portion. In one or more embodiments, the client determines whether there are additional subportions of the workflow portion using workflow information associated with the workflow portion. The workflow information may specify workflow subportions associated with the workflow portion as well as what entity is to perform the workflow subportion (i.e., the client or the accelerators of the accelerator pool). In one or more embodiments, if the workflow information indicates that there are additional subportions of the workflow portion, then the client may determine there are additional subportions of the workflow. In one or more embodiments, if the workflow information indicates that there are not additional subportions of the workflow portion, then the client may determine there are not additional subportions of the workflow.

In one or more embodiments, if it is determined that there are additional subportions of the workflow, then the method may proceed to Step 266 or Step 260 based on whether the next additional subportion of the workflow portion is to be performed by the client or the accelerators of the accelerator pool. In one or more embodiments, if it is determined that there are no additional subportions of the workflow portion, then the method may end following step 272.

Figure 3:
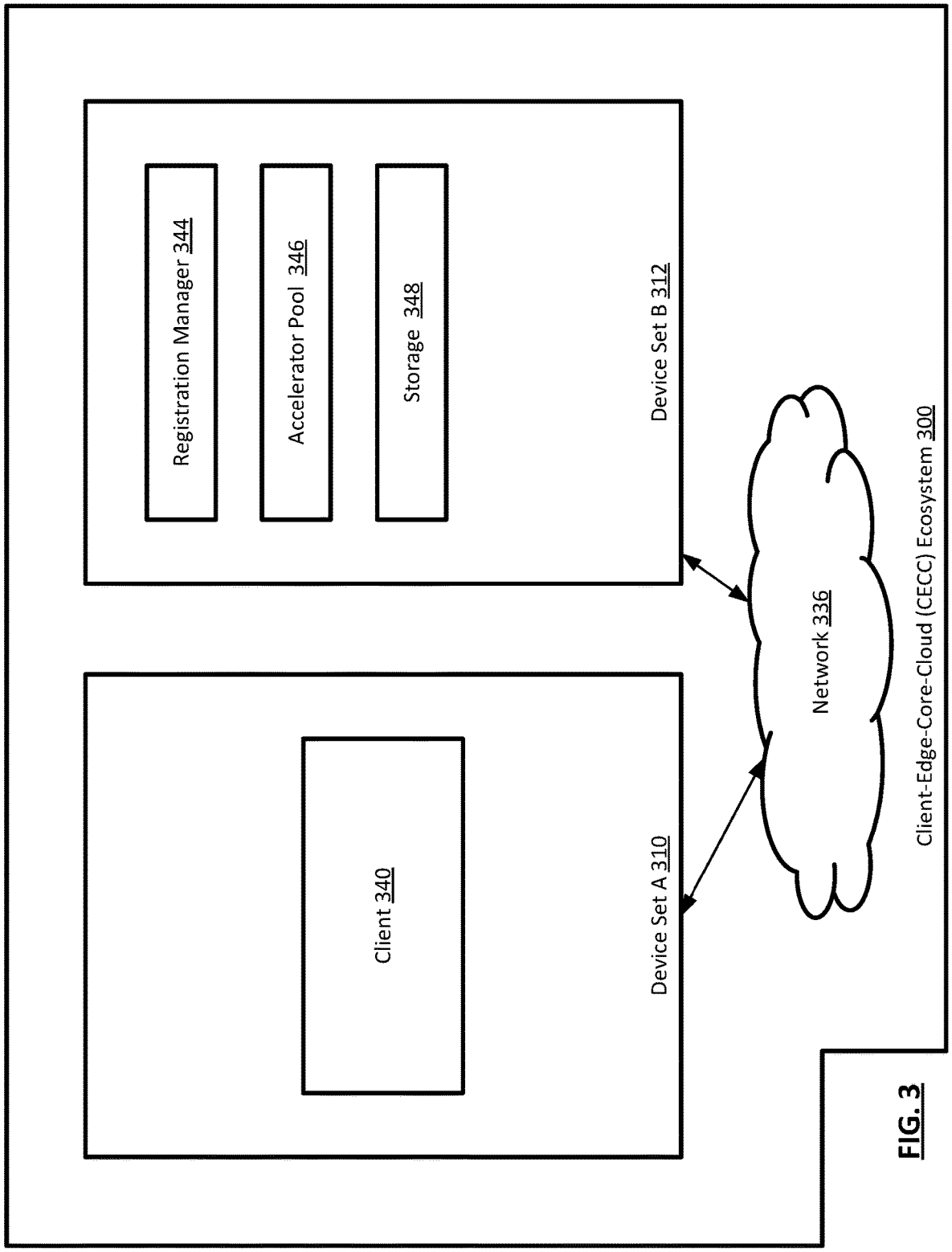
FIG. 3 shows an example in accordance with one or more embodiments of the invention.

FIG. 3 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example. This example is intended to be a simple example to illustrate, at least in part, concepts described herein. One of ordinary skill will appreciate that a real-world use of embodiments described herein a device ecosystem organized and interconnected in any manner, and that any number of different workflows to achieve any number of different results may be deployed in such an ecosystem of devices.

Referring to FIG. 3, consider a scenario in which a user of a retail store has security cameras deployed in a store at self-checkout stations to monitor customers using the self-checkout stations by recording video data associated with customers using the self-checkout stations. Based on the video data, the store wants to use the run a machine learning (ML) algorithm to determine whether potential crimes were committed while customers used the self-checkout stations. To achieve this goal, the store needs to train and execute the ML algorithm that has been trained to recognize when video data of the checkout stations indicate that potential crime has occurred.

In such a scenario, the store will utilize the CECC ecosystem (300), which includes device set A (310) and device set B (312) which have been provisioned to execute the workflow portion of training and executing the ML algorithm. To perform the workflow, the client (340) of device set A (310) is configured to perform the first workflow portion using accelerators. Furthermore, a registration manager (344) of device set B (312) is configured to manage accelerators of an accelerator pool (346) to perform workflow portions. The accelerator pool (346) includes four accelerators, and each accelerator of the accelerator pool (346) is a graphics processing unit.

At a first point in time, the client (340) sends a request to the registration manager (344) to perform the first workflow portion. The request specifies a maximum quantity of accelerators, four accelerators, and a minimum quantity of accelerators, two accelerators. In response to obtaining the request, the registration manager (344) identifies the maximum quantity of accelerators associated with the request as four accelerators and the minimum quantity of accelerators associated with the request as two accelerators using the information included in the request. Based on the minimum quantity and maximum quantity of accelerators associated with the request to perform the first workflow, the registration manager (344) identifies the accelerator pool (346), which includes the maximum quantity of accelerators. The registration manager (344) identifies a virtual hard disk drive included in device set B (312) as the storage (348) based on information included in the request. After identifying the accelerator pool (346), the registration manager (344) establishes a connection between the client (340) and the accelerators of the accelerator pool (346) by virtualizing the accelerators included in the accelerator pool to obtain virtual accelerators. Additionally, the registration manager (344) establishes a connection between the client (340) and the storage (348) and the accelerators of the accelerator pool (346) and the storage (348) using a NFS.

The registration manager (344) makes a determination that no other workflow portion is executing on the accelerators of the accelerator pool (346) at that point in time. Based on the determination, the registration manager assigns a 100% time-sliced portion of the accelerators of the accelerator pool, or four virtual accelerators, to the workflow portion and provides accelerator information and NFS information to the client (340). After obtaining the accelerator information, the client (340) begins performing the first workflow portion using the storage (348) and a 100% time-sliced portion of the accelerators of the accelerator pool (346). In other words, the client (340) begins training the ML algorithm using all of the operating time of the accelerators of the accelerator pool (346).

The first subportion of the workflow includes writing the training data into the storage. The client (340) obtains the training data and writes the training data to the storage (348) by mounting the storage through the NFS. After performing the first subportion of the workflow portion, the client (340) generates a tag associated with the data stored in the storage. The tag specifies references to the data and includes instructions for the accelerators of the accelerator pool (346) to perform the next subportion of the workflow, training the ML algorithm. After obtaining the tag, the accelerators of the accelerator pool (346) perform the second subportion of the workflow using the information included in the tag and data stored in the storage. The accelerators of the accelerator pool (346) train the ML algorithm using the data stored in the storage to generate a trained ML algorithm. The accelerators of the accelerator pool (346) then generate a tag associated with the data stored in the storage, including references to the trained ML algorithm. The accelerators of the accelerator pool (346) send the tag to the client (340).

In response to obtaining the tag, the client (340) performs the third subportion of the workflow portion by writing verification data to the storage (348). After performing the third subportion of the workflow portion, the client (340) generates a tag associated with the data stored in the storage (348). The tag specifies references to the verification data and the trained ML algorithm and includes instructions for the accelerators of the accelerator pool (346) to perform the next subportion of the workflow, verifying the trained ML algorithm After obtaining the tag, the accelerators of the accelerator pool (346) perform the fourth subportion of the workflow using the information included in the tag and data stored in the storage (348). The accelerators of the accelerator pool (346) train the ML algorithm using the data stored in the storage to generate a trained ML algorithm. The accelerators of the accelerator pool (346) then generate a tag associated with the data stored in the storage, including references to the verified and trained ML algorithm. The accelerators of the accelerator pool (346) then send the tag to the client (340).

In response to obtaining the tag, the client (340) performs the fifth subportion of the workflow portion by writing live video data to the storage (348). After performing the fifth subportion of the workflow portion, the client (340) generates a tag associated with the data stored in the storage (348). The tag specifies references to the live video data and the verified and trained ML algorithm and includes instructions for the accelerators of the accelerator pool (346) to perform the next subportion of the workflow, generating the ML algorithm results by executing the ML algorithm After obtaining the tag, the accelerators of the accelerator pool (346) perform the sixth subportion of the workflow portion using the information included in the tag and data stored in the storage (348). The accelerators of the accelerator pool (346) execute the verified and trained ML algorithm using the live video data stored in the storage to generate ML algorithm results. The accelerators of the accelerator pool (346) then generate a tag associated with the data stored in the storage, including references to the ML algorithm results. After receiving the tag, the client (340) determines that there are no additional subportions of the workflow portion and uses the results to perform a subsequent workflow portion such as notifying a user of the store of potential crimes.

In the above example, a registration manager configured to manage accelerator pools was able to configure an accelerator pool to perform a workflow portion using a storage accessible by both a client and accelerators of the accelerator pool. Once the workflow portion began execution using the accelerators of and accelerator pool, the client performed subportions of the workflow portion, generated tags associated with data stored in the storage, and passed control over to the accelerators of the accelerator pool. In response to obtaining the tags, the accelerators of the accelerator pool performed subportions of the workflow portion using the storage, generated tags associated with data stored in the storage, and then passed control of the storage back to the client by sending the tag to the client. In doing so, large data transfers required to perform workflow portions using accelerators of the accelerator pools are mitigated, improving the efficiency of performing workflows in complex device ecosystems.

Figure 4:
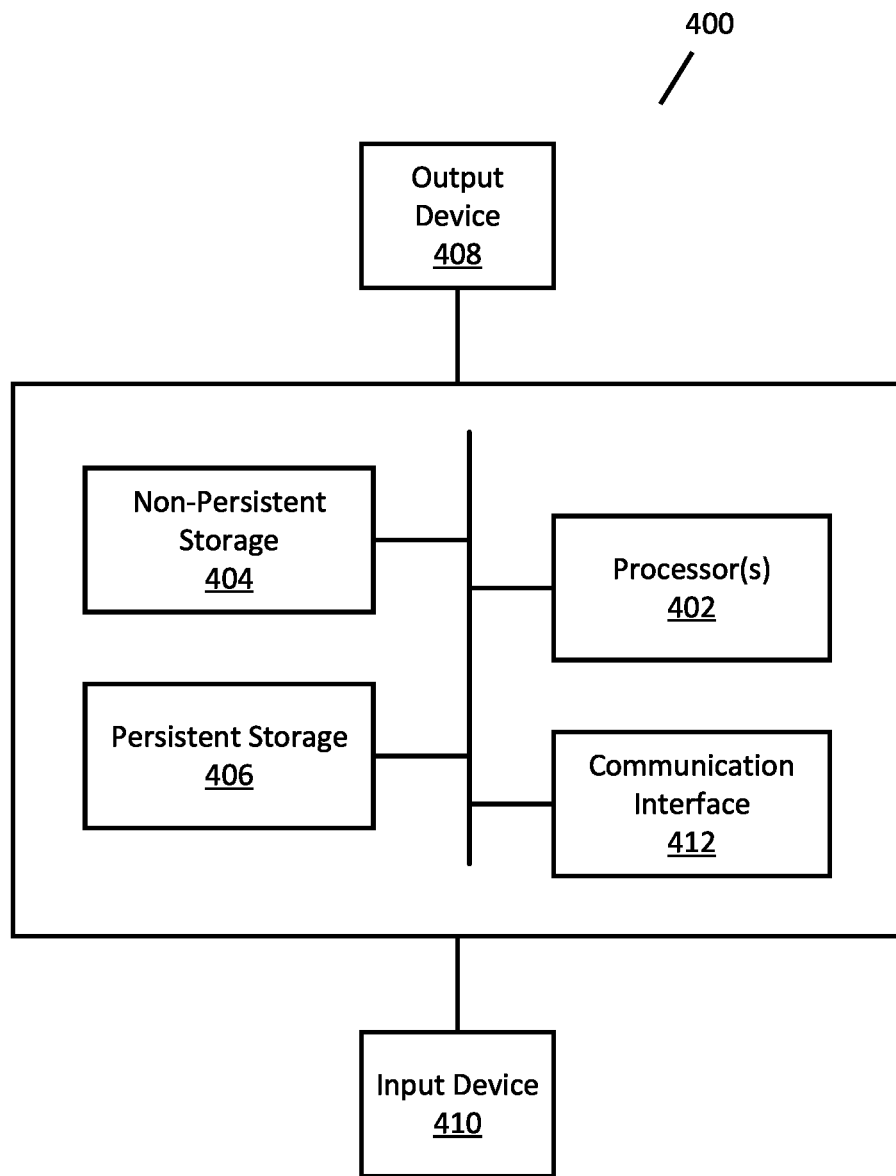
FIG. 4 shows a computing system in accordance with one or more embodiments of the invention.

As discussed above, embodiments of the invention be implemented using computing devices. FIG. 4 shows a diagram of a computing device in accordance with one or more embodiments of the invention. The computing device (400) include one or more computer processors (402), non-persistent storage (404) (e.g., volatile memory, such as random access memory (RAM), cache memory), persistent storage (406) (e.g., a hard disk, an optical drive such as a compact disc (CD) drive or digital versatile disc (DVD) drive, a flash memory, etc.), a communication interface (412) (e.g., Bluetooth® interface, infrared interface, network interface, optical interface, etc.), input devices (410), output devices (408), and numerous other elements (not shown) and functionalities. Each of these components is described below.

In one embodiment of the invention, the computer processor(s) (402) be an integrated circuit for processing instructions. For example, the computer processor(s) be one or more cores or micro-cores of a processor. The computing device (400) also include one or more input devices (410), such as a touchscreen, keyboard, mouse, microphone, touchpad, electronic pen, or any other type of input device. Further, the communication interface (412) include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices be the same or different from the input device(s). The input and output device(s) be locally or remotely connected to the computer processor(s) (402), non-persistent storage (404), and persistent storage (406). Many different types of computing devices exist, and the aforementioned input and output device(s) take other forms.

Embodiments described herein use a registration manager to manage the provisioning of accelerator pools and a storage to perform workflow portions. In one or more embodiments, provisioning workflow portions using a shared storage between clients and accelerators of accelerator pools allows for workflow portions to be performed while minimizing large transfers of data. In addition, in one or more embodiments, as workflow flow subportions are performed by clients and accelerators of the accelerator pools, tags are generated and sent to target entities to pass control of the storage to the target entity, thereby reducing the likelihood of workflow portion failures due to data corruption of the storage. Moreover, by minimizing the transfer of large amounts of data during the performance of workflow portions using accelerator pools, the efficiency of performing the aforementioned workflow portions may be improved.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing accelerator pools to perform subportions of portions of workflows in a system having at least a registration manager associated with the accelerator pools, the method comprising:
 obtaining, from a client, by the registration manager associated with the accelerator pools, a request to perform a portion of a workflow using accelerators;
 identifying a minimum quantity and a maximum quantity of accelerators associated with the request;
 identifying a storage to store data associated with the portion of the workflow;
 identifying an accelerator pool of the accelerator pools that comprises at least the maximum quantity of accelerators;

establishing a connection between the client, the storage, and accelerators of the accelerator pool to perform the portion of the workflow, wherein:
  establishing the connection between the client, the storage, and the accelerators of the accelerator pool comprises virtualizing the accelerators of the accelerator pool by time-slicing the accelerators to obtain time-sliced portions of the accelerators, and the time-sliced portions of the accelerators comprise virtual accelerators; and
initiating the performance of the portion of the workflow using the storage, the client, and the accelerators of the accelerator pool;
after initiating the performance of the portion of the workflow using the storage, the client, and the accelerators of the accelerator pool:
  performing, by the client, a first subportion of the portion of the workflow using data stored in the storage;
  generating a first tag associated with the data;
  sending the first tag to the accelerators of the accelerator pool;
  performing, by the accelerators using the first tag, a second subportion of the portion of the workflow using the data stored in the storage;
  generating a second tag associated with the data in the storage, wherein the first and second tags grant permission to the accelerators to modify the data in the storage, and comprise at least a reference to the data in the storage and operations performed to the data;
  sending the second tag to the client;
  determining if there are any additional subportions of the workflow;
  performing, based upon the determination and using the second tag, a third subportion of the portion of the workflow using the data stored in the storage.

2. The method of claim 1, wherein the performing the first subportion of the portion of the workflow and the performing of the second subportion of the portion of the workflow each comprise accessing the data from the storage.

3. The method of claim 1, wherein performing the first subportion of the portion of the workflow by the client comprises one selected from a group consisting of:
  modifying the data stored in the storage; and
  initiating the performance of the second subportion of the workflow.

4. The method of claim 1, wherein establishing the connection between the client, the storage, and the accelerators of the accelerator pool further comprises:
  storing the data in the storage; and
  granting access to the storage to the client and the accelerators of the accelerator pool.

5. The method of claim 1, wherein an accelerator of the accelerators comprises a graphics processing unit.

6. A non-transitory computer readable medium comprising computer readable program code, which when executed by a computer processor enables the computer processor to perform a method for managing accelerator pools to perform subportions of portions of workflows in a system having at least a registration manager associated with the accelerator pools, the method comprising:
  obtaining, from a client, by the registration manager associated with accelerator pools, a request to perform a portion of a workflow using accelerators;
  identifying a minimum quantity and a maximum quantity of accelerators associated with the request;
  identifying a storage to store data associated with the portion of the workflow;
  identifying an accelerator pool of the accelerator pools that comprises at least the maximum quantity of accelerators;
  establishing a connection between the client, the storage, and accelerators of the accelerator pool to perform the portion of the workflow, wherein:
    establishing the connection between the client, the storage, and the accelerators of the accelerator pool comprises virtualizing the accelerators of the accelerator pool by time-slicing the accelerators to obtain time-sliced portions of the accelerators, and
    the time-sliced portions of the accelerators comprise virtual accelerators; and
  initiating the performance of the portion of the workflow using the storage, the client, and the accelerators of the accelerator pool;
  after initiating the performance of the portion of the workflow using the storage, the client, and the accelerators of the accelerator pool:
    performing, by the client, a first subportion of the portion of the workflow using data stored in the storage;
    generating a first tag associated with the data;
    sending the first tag to the accelerators of the accelerator pool;
    performing, by the accelerators using the first tag, a second subportion of the portion of the workflow using the data stored in the storage;
    generating a second tag associated with the data in the storage, wherein the first and second tags grant permission to the accelerators to modify the data in the storage, and comprise at least a reference to the data in the storage and operations performed to the data;
    sending the second tag to the client;
    determining if there are any additional subportions of the workflow;
    performing, based upon the determination and using the second tag, a third subportion of the portion of the workflow using the data stored in the storage.

7. The non-transitory computer readable medium of claim 6, wherein the performing the first subportion of the portion of the workflow and the performing of the second subportion of the portion of the workflow comprises accessing the data from the storage.

8. The non-transitory computer readable medium of claim 6, wherein performing the first subportion of the portion of the workflow by the client comprises one selected from a group consisting of:
  modifying the data stored in the storage; and
  initiating the performance of the second subportion of the workflow.

9. The non-transitory computer readable medium of claim 6, wherein establishing the connection between the client, the storage, and the accelerators of the accelerator pool further comprises:
  storing the data in the storage; and
  granting access to the storage to the client and the accelerators of the accelerator pool.

10. The non-transitory computer readable medium of claim 6, wherein each accelerator of the accelerators comprises a graphics processing unit.

11. A system for managing accelerator pools to perform subportions of portions of workflows, the system comprising:

an accelerator pool, comprising accelerators;
a registration manager associated with the accelerator pool, comprising a processor and memory, and configured to:
  obtain, from a client, a request to perform a portion of a workflow using the of accelerators of the accelerator pool;
  identify a minimum quantity and a maximum quantity of accelerators associated with the request;
  identify a storage to store data associated with the portion of the workflow;
  identify that the accelerator pool comprises at least the maximum quantity of accelerators;
  establish a connection between the client, the storage, and the accelerators to perform the portion of the workflow, wherein:
    establishing the connection between the client, the storage, and the accelerators of the accelerator pool comprises virtualizing the accelerator pool of the accelerators by time-slicing the accelerators to obtain time-sliced portions of the accelerators, and
    the time-sliced portions of the accelerators comprise virtual accelerators; and
  initiate the performance of the portion of the workflow using the storage, the client, and the accelerators;
  after initiating the performance of the portion of the workflow using the storage, the client, and the accelerators of the accelerator pool:
    perform, by the client, a first subportion of the portion of the workflow using data stored in the storage;
    generate a first tag associated with the data;
    send the first tag to the accelerators of the accelerator pool;
    perform, by the accelerators using the first tag, a second subportion of the portion of the workflow using the data stored in the storage;
    generate a second tag associated with the data in the storage, wherein the first and second tags grant permission to the accelerators to modify the data in the storage, and comprise at least a reference to the data in the storage and operations performed to the data;
    send the second tag to the client;
    determine if there are any additional subportions of the workflow;
    perform, based upon the determination and using the second tag, a third subportion of the portion of the workflow using the data stored in the storage.

* * * * *